Sept. 22, 1925.

J. D. SLYDER ET AL

MECHANISM FOR TRIMMING BRAKE DRUMS

Filed Nov. 5, 1923    2 Sheets-Sheet 1

1,554,302

Inventors
Jesse D. Slyder.
Charles R. McMinn;

By R. S. Berry
Attorney.

Sept. 22, 1925.  1,554,302
J. D. SLYDER ET AL
MECHANISM FOR TRIMMING BRAKE DRUMS
Filed Nov. 5, 1923  2 Sheets-Sheet 2

Inventors
Jesse D. Slyder;
Charles R. McMinn;
By R. S. Berry
Attorney.

Patented Sept. 22, 1925.

1,554,302

UNITED STATES PATENT OFFICE.

JESSE D. SLYDER, OF COMPTON, AND CHARLES R. McMINN, OF LOS ANGELES, CALIFORNIA, ASSIGNORS OF ONE-THIRD TO JOHN F. OMEROD, OF LOS ANGELES, CALIFORNIA.

MECHANISM FOR TRIMMING BRAKE DRUMS.

Application filed November 5, 1923. Serial No. 672,943.

*To all whom it may concern:*

Be it known that we, JESSE D. SLYDER and CHARLES R. McMINN, citizens of the United States, residing, respectively, at Compton and Los Angeles, in the county of Los Angeles and State of California, have invented new and useful Improvements in Mechanism for Trimming Brake Drums, of which the following is a specification.

This invention relates to a mechanism for trueing vehicular brake drums.

An object of our invention is the provision of a lathe adapted to true brake drums.

Another object of our invention is the provision of a special lathe for trueing brake drums without removing the same from the wheel to which it is secured.

Another object of our invention is the provision of a lathe which will automatically true a brake drum after adjustment of the drum and the lathe parts.

A further object is to provide a mechanism of the above character embodying adjustments whereby the machine may be adapted to operate on brake drums of various sizes, and in which the parts are so arranged and the mode of operation such that cylindrical brake drums may be trued either on their inner or outer perimeters, or may be trued on both their inner and outer perimeters at the same time.

Further objects may be inferred from a reading of the following specification.

Referring to the drawings—

Figure 1:
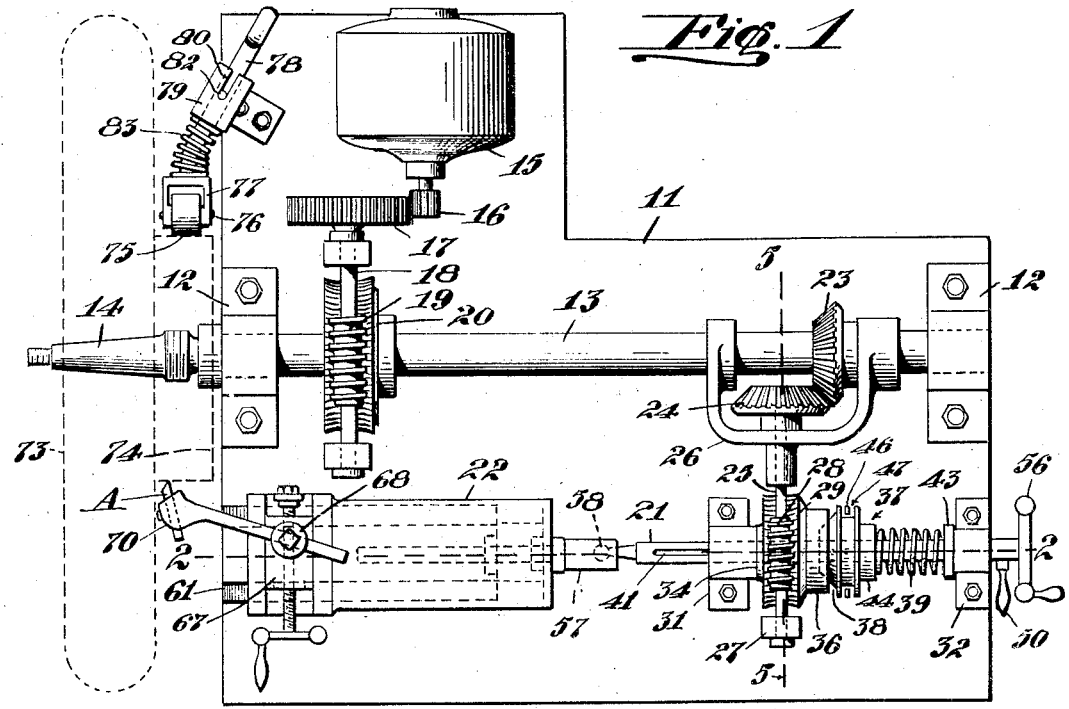
Fig. 1 shows a plan view of the lathe.
Figure 2:
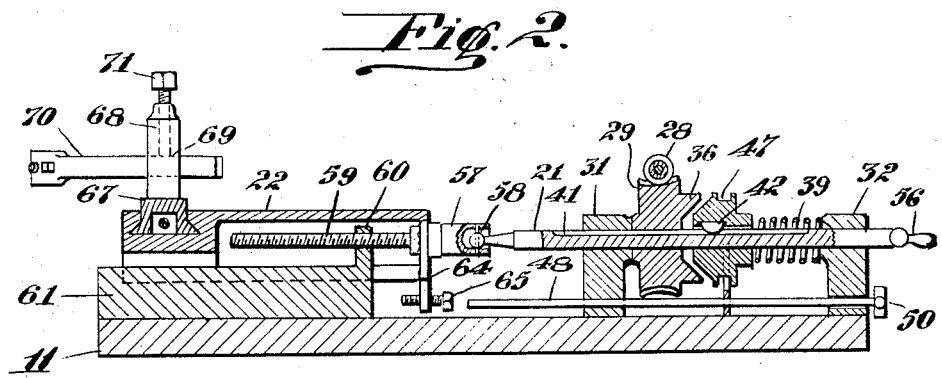
Fig. 2 is a longitudinal section taken on the line 2—2 of Fig. 1.

More particularly, 11 indicates a bed plate which may be of any suitable construction to form a support for the lathe mechanism. Spaced apart, on the bed plate is a pair of standards 12 on which a shaft or spindle 13 is revolubly mounted. One end of the shaft extends outwardly from the bed plate forming a tapered projection 14 adapted to receive the hub of a vehicle wheel and on which the wheel is fixedly mounted so that on rotation of the spindle 13 the wheel will revolve therewith. The spindle 13 is here shown as driven by a motor 15 through a spur gear 16 fixedly mounted on the motor shaft and engaging a spur gear 17 which is fixedly mounted at an end of a shaft 18 which carries a worm 19 engaging a worm wheel 20 fixedly mounted on the spindle 13. Mechanism is provided for transmitting rotary motion from the spindle 13 to a shaft 21 parallel therewith which actuates a carriage 22 adapted to carry the tool which trues the brake drum. The mechanism for transmitting motion from the spindle 13 to the shaft 21 is here shown as comprising a bevel gear 23 fixedly mounted on the spindle 13. The gear 23 engages a bevel gear 24 which is mounted on an end of a shaft 25 which is supported in part on a yoke 26 mounted on the spindle 13, and in part by a standard 27 which is secured to, and rises from, the bed plate 11. The shaft 25 carries a worm 28 which engages a worm wheel 29. The worm wheel 29 is mounted free on the shaft 21 which is supported by two spaced standards 31 and 32 rising from, and secured to, the bed plate 11. The outer end of a hub 34 of the worm wheel 29 abuts against an outer side portion of the standard 31 by which the worm wheel is held in place.

Figure 6:
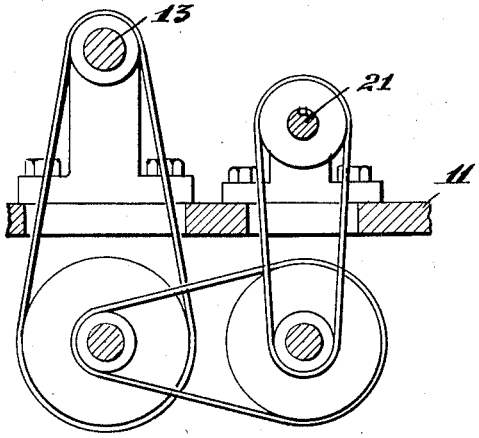
Fig. 6 is a view taken on the same line as Figure 5, but showing the method of transmitting motion by means of belts and pulleys instead of by the gear mechanism shown in Figure 5.

In lieu of the gearing just described a train of pulleys and belts as shown in Figure 6 may be employed for transmitting a rotary motion from the spindle 13 to the shaft 21.

Figure 3:
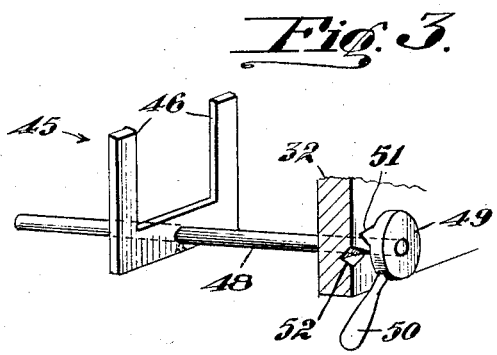
Fig. 3 is a perspective view of a mechanism for engaging and disengaging members of a clutch.
Figure 4:
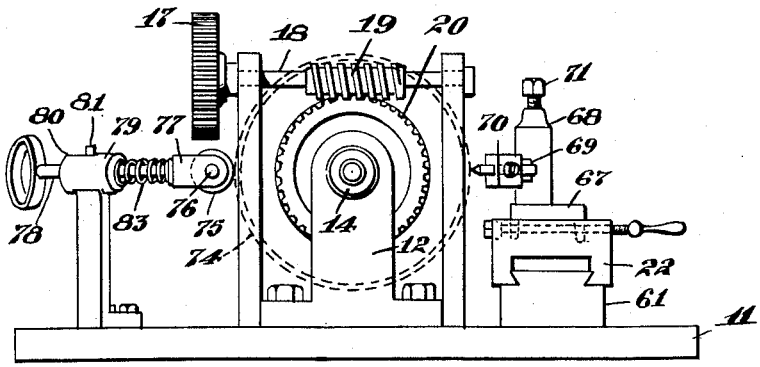
Fig. 4 is a view of the lathe as seen in front elevation with parts in the rear removed.
Figure 5:
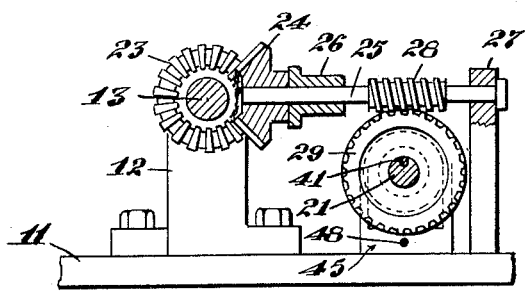
Fig. 5 is a section taken on the line 5—5 of Figure 1.

Mechanism is provided for locking the worm wheel 29 to the shaft 21 during the operation of the lathe, and for automatically causing the worm wheel 29 to rotate freely on the shaft 21 and thereby stop motion of the carriage 22 when the work has been completed. To accomplish this, a member 36 of a clutch 37 is affixed to the outer side of the worm wheel 29. Another member 38 of the clutch 37, normally engaging the clutch member 36, is mounted on the shaft 21 and secured thereto by means of a splined connection, which consists of a longitudinal groove 41 in the shaft 21 and a key 42 secured to the clutch member 38 and projecting into the groove 41. To keep the clutch member 38 normally engaged with the clutch member 36, a compressed coiled spring 39 encircles a portion of the shaft 21 and presses outwardly at one end against the collar 43 secured to the standard 32, and at its other and exerts pressure against a collar 44 of the clutch member 38. In working relation with the clutch member 38 is a clutch-disengaging mechanism, shown in detail in Figure 3, comprising a forked yoke 45, the prongs 46 of which normally lie between the sides of, and are positioned out of contact with, the bottom of, a groove 47 which is formed in the periphery of the clutch member 38. To the middle portion of the lower end of the yoke 45 is secured a horizontal rod 48 which extends in opposite directions from the yoke 45. In one direction the rod 48 passes through an aperture in the standard 31 and in the opposite direction through an aperture in the standard 32. Mounted on the outer end portion of the rod 48, outside of the standard 32 is a disk 49 to the periphery of which is secured a handle 50 provided for the purpose of manually disengaging the clutch members. Extending from the inner surface of the disk 49 is a tapered projection 51 which engages a notch 52 cut in the standard 32 when the clutch members 36 and 38 are locked.

To the outer end of the shaft 21 is secured a carriage-traversing crank 56 by which the carriage 22 may be adjusted when the clutch 37 is disengaged. The inner end of the shaft 21 is secured to a member 57 in alignment therewith by means of a universal joint 58. The member 57 is affixed at its end opposite the universal joint 58 to a lead screw 59 which moves the carriage 22. The lead screw 59 is threaded in a standard 60 projecting from a bed 61 on which the carriage 22 is slidably mounted by means of a dovetail joint. Downwardly from the upper portion of the carriage 22 extends a vertical flange or plate 64 having an aperture which encircles during the travel of the carriage, the lead screw 59 and the member 57. Through the lower end portion of the flange 64 is threaded a bolt 65 in horizontal position and in alignment with the shaft 48.

On the carriage 22 is slidably mounted in the usual manner, a cross slide 67 which carries a tool post 68 having a horizontal slot 69 in which is positioned a cutting tool 70, and a vertical clamp screw 71 for engaging the shank of the tool.

When it is desired to true a brake drum, a wheel 73 and an attached drum 74 are mounted on the projection 14 of the spindle 13 and secured thereon by any suitable means against rotation relative to the spindle. In pressure contact with a portion of the periphery of the drum 74, for the purpose of giving additional support to the drum, is a roller 75 rotatable on an axle 76 carried in a yoke 77 to which is secured a shank 78 which passes through a sleeve 79 secured to the bed plate 11 and having a slot 80 extending from its rear end. To the shank 78 is affixed a vertical pin 82 passing through the slot 80 of the sleeve 79. The pin 82 is normally held against the inner end of the slot 80 by means of a compression coiled spring 83 which encircles the shank 78 and exerts an outward pressure against the sleeve 71 and the inner end of the yoke 77.

In order to true the drum 74 on its outer surface, the carriage 22 is positioned so that the cutting tool 70 is in contact with that portion of the periphery of the drum which is nearest the wheel. In order to allow the carriage 22 to be so adjusted, the clutch-releasing mechanism is pulled outwardly by means of the handle 50 on the disk 49. This outward motion disengages the projection 51 on the disk 49 from the notch 52 in the standard 32, and simultaneously causes the prongs 46 of the yoke 45 to be brought into contact with the outer flange of the peripheral groove 47 in the clutch member 38. When the clutch releasing mechanism has been pulled outwardly to a sufficient distance, the clutch member 38, slidable on the shaft 30 by reason of its splined connection therewith is disengaged from the clutch member 36. The carriage 22, and therefore the cutting tool 70, may then be properly adjusted by turning the carriage-traversing crank 56.

When the motor 15 is started, the members of the clutch 37 being locked, the wheel and the drum rotate, and the cutting tool moves away from the wheel, trueing the drum as it moves.

The gear ratio is preferably made such that the outer periphery of the drum, as finally cut, has a slightly roughened surface, which provides a brake with greater friction and therefore greater effectiveness when applied to the drum.

In our device, mechanism is provided for automatic disengagement of the carraige feed when the trueing of the drum has been completed. The automatic disengagement is effected by so adjusting the screw 65 in the flange 64 of the carriage 22 that when the drum has been completely trued, the head of the screw 65 comes in contact with the inner end of the rod 48. The carriage continuing its travel, the rod 48 will be pushed outwardly. The outward motion of the rod 48 causes the yoke 45 to disengage the clutch member 38 from the clutch member 36. The disengaged clutch 37 leaves the worm wheel 29 free to rotate on the shaft 21 so that upon further rotation of the worm wheel 29, the shaft 21 will not be rotated and therefore the carriage 22 will cease traveling.

It will be seen from the foregoing that we have provided a machine whereby vehicular brake drums may be trued or surfaced without detaching the drum from the wheel on which it is carried, and which machine is particularly serviceable in garages, machine shops and the like either in resurfacing worn brake drums of motor vehicles or rendering distorted or warped brake drums accurately cylindrical. It is also apparent that the work may be economically performed as after mounting the brake drum on the spindle, adjusting the cutting tool to its proper position and setting the machine in operation the work will be performed without requiring the attention of an operator who may employ his time with other matters throughout the operation of the machine.

Another important feature resides in the facility with which the cutting tool may be manually advanced and retracted in adjusting it to the drum through the medium of the shaft 21 and crank 56 thereon; the clutch affording a means for throwing the shaft 21 out of operative connection with the motor drive so that manual rotation of the shaft 21 may be readily effected. A further desirable feature of the machine resides in employing the clutch as a means for automatically stopping movement of the cutting tool after it has traversed the drum in surfacing the latter.

While we have shown and described a specific embodiment of our invention we do not limit ourselves to the exact details of construction shown in the drawings but may employ such modifications as come within the scope of the appended claims.

We claim—

1. In a machine for trueing brake drums, the combination of a spindle, a tapered projection at one end of said spindle for holding the object to be worked upon, a motor, positive means for rotating said spindle from said motor, a shaft, a worm wheel mounted free on said shaft, positive means for rotating said worm wheel, a clutch member secured to said worm wheel, another clutch member mounted on said shaft and secured thereto by means of a splined connection and normally engaging the clutch member secured to said worm wheel, clutch-disengaging mechanism, a crank mounted on said shaft, a lead screw joined to said shaft, a carriage secured to said lead screw, means on said carriage for holding and adjusting a tool, and means for preventing chatter of the article worked upon.

2. In a mechanism for trueing brake drums, a rotatable spindle adapted to hold the object to be worked upon, a shaft, positive means for transmitting rotary motion from said spindle to said shaft, said means comprising a pair of bevel gears, a worm, a worm wheel engaging said worm, said worm wheel being mounted free on said shaft, a clutch member secured to said worm wheel, another clutch member mounted on said shaft and secured thereto by means of a splined connection and normally engaging the clutch member secured to said worm wheel, clutch-disengaging mechanism, a crank secured to said shaft, a lead screw connected to an end of said shaft, a carriage secured to said lead screw, a cutting tool, means on said carriage for holding and adjusting said cutting tool, an automobile brake drum on said projection of said spindle, a roller exerting contact pressure on the periphery of said drum opposite said tool, and automatic means for actuating said clutch-disengaging mechanism when said cutting tool is at a predetermined position.

3. In a machine for trueing brake drums, the combination of a rotary spindle, means whereby a vehicle wheel carrying a brake drum may be affixed to said spindle to rotate therewith, a motor, positive means for rotating said spindle from said motor, a shaft, a lead screw secured to said shaft, means for driving said shaft and lead screw from said wheel carrying spindle, a carriage connected to said lead screw, tool holding and adjusting means on said carriage, a cutting tool thereon arranged to work on a periphery of the brake drum; said carriage, lead screw, and shaft being mounted and arranged so that on rotation of the shaft and lead screw the cutting tool will be caused to advance transversely across the brake drum as the latter is rotated to effect a cutting action thereon, and means for exerting a yieldable pressure on the periphery of the brake drum to prevent chatter thereof.

4. In a machine for trueing brake drums on vehicle wheels, a rotary spindle, means on said spindle adapted to engage the hub of a vehicle wheel to support the latter thereon, a motor, positive gear connections between said motor and spindle for rotating said spindle by said motor, a carriage mounted to slide parallel to said spindle, a tool holder on said carriage, a cutting tool carried by said holder, adapted to effect a cutting action on a periphery of a brake drum on the vehicle wheel as the latter rotates with said spindle, and means whereby rotation of said spindle will effect movement of said carriage to cause the cutting tool to advance transversely of the brake drum and effect trueing thereof.

5. In a machine for trueing brake drums on vehicle wheels, a bed plate, a horizontal spindle carried by said bed plate having an outer end portion adapted to be inserted in the hub of a vehicle wheel, means for engaging the wheel hub with the spindle whereby rotation of the spindle will effect rotation of the wheel, means for rotating said spindle, a carriage slidably supported on said bed plate, a tool holder on said carriage, a cutting tool carried by said holder adapted to be positioned to effect a cutting action on the periphery of a brake drum on the wheel carried by the spindle, and means whereby rotation of said spindle will effect movement of said carriage to cause the cutting tool to advance transversely of the brake drum and effect trueing thereof.

JESSE D. SLYDER.
CHARLES R. McMINN.